United States Patent
Rombakh et al.

(10) Patent No.: US 10,567,516 B2
(45) Date of Patent: Feb. 18, 2020

(54) SHARING LOCAL NETWORK RESOURCES WITH A REMOTE VDI INSTANCE

(71) Applicant: Wyse Technology L.L.C., Santa Clara, CA (US)

(72) Inventors: Oleg Rombakh, Los Gatos, CA (US); Richard Goldberg, Los Gatos, CA (US)

(73) Assignee: Wyse Technology L.L.C., Santa Clara, CA (US)

( * ) Notice: Subject to any disclaimer, the term of this patent is extended or adjusted under 35 U.S.C. 154(b) by 278 days.

(21) Appl. No.: 15/441,631

(22) Filed: Feb. 24, 2017

(65) Prior Publication Data

US 2018/0248958 A1 Aug. 30, 2018

(51) Int. Cl.
| | | |
|---|---|---|
| G06F 15/16 | (2006.01) | |
| H04L 29/08 | (2006.01) | |
| H04L 29/06 | (2006.01) | |
| H04L 29/12 | (2006.01) | |

(52) U.S. Cl.
CPC ............ *H04L 67/141* (2013.01); *H04L 67/42* (2013.01); *H04L 69/22* (2013.01); *H04L 61/2521* (2013.01)

(58) Field of Classification Search
CPC ..... H04L 69/18; H04L 67/40; H04L 61/2514; H04L 61/251; H04L 61/2507; H04L 61/2503; H04L 61/25; H04L 67/141; H04L 69/22; H04L 67/42; H04L 61/2521
USPC ........................................................ 709/219
See application file for complete search history.

(56) References Cited

U.S. PATENT DOCUMENTS

| | | | |
|---|---|---|---|
| 2005/0050211 A1* | 3/2005 | Kaul | H04L 29/06027 709/229 |
| 2005/0114711 A1* | 5/2005 | Hesselink | H04L 63/0209 726/4 |
| 2005/0185647 A1* | 8/2005 | Rao | H04L 12/4641 370/392 |
| 2008/0201485 A1* | 8/2008 | Patwardhan | H04L 29/06 709/238 |

* cited by examiner

*Primary Examiner* — Umar Cheema
*Assistant Examiner* — Anh Nguyen
(74) *Attorney, Agent, or Firm* — Kirton McConkie; Brian Tucker

(57) ABSTRACT

Local network resources can be seamlessly accessed from a remote session. A remoting client that executes on a client terminal and a remoting service that executes in a remote session can each be configured to implement a virtual network pseudo device. These virtual network pseudo devices can be configured to communicate network communications via a virtual channel with the virtual channel endpoints performing any necessary network address translation. As a result, when the remote session host attempts to discover local network resources, the corresponding network communications will be routed over the virtual channel and transmitted over the client's local area network. Any resources on the client's local area network will respond accordingly with this responses being routed back over the virtual channel to the remote session host thus causing the resources to appear as if they were part of the same local area network as the remote session host.

20 Claims, 16 Drawing Sheets

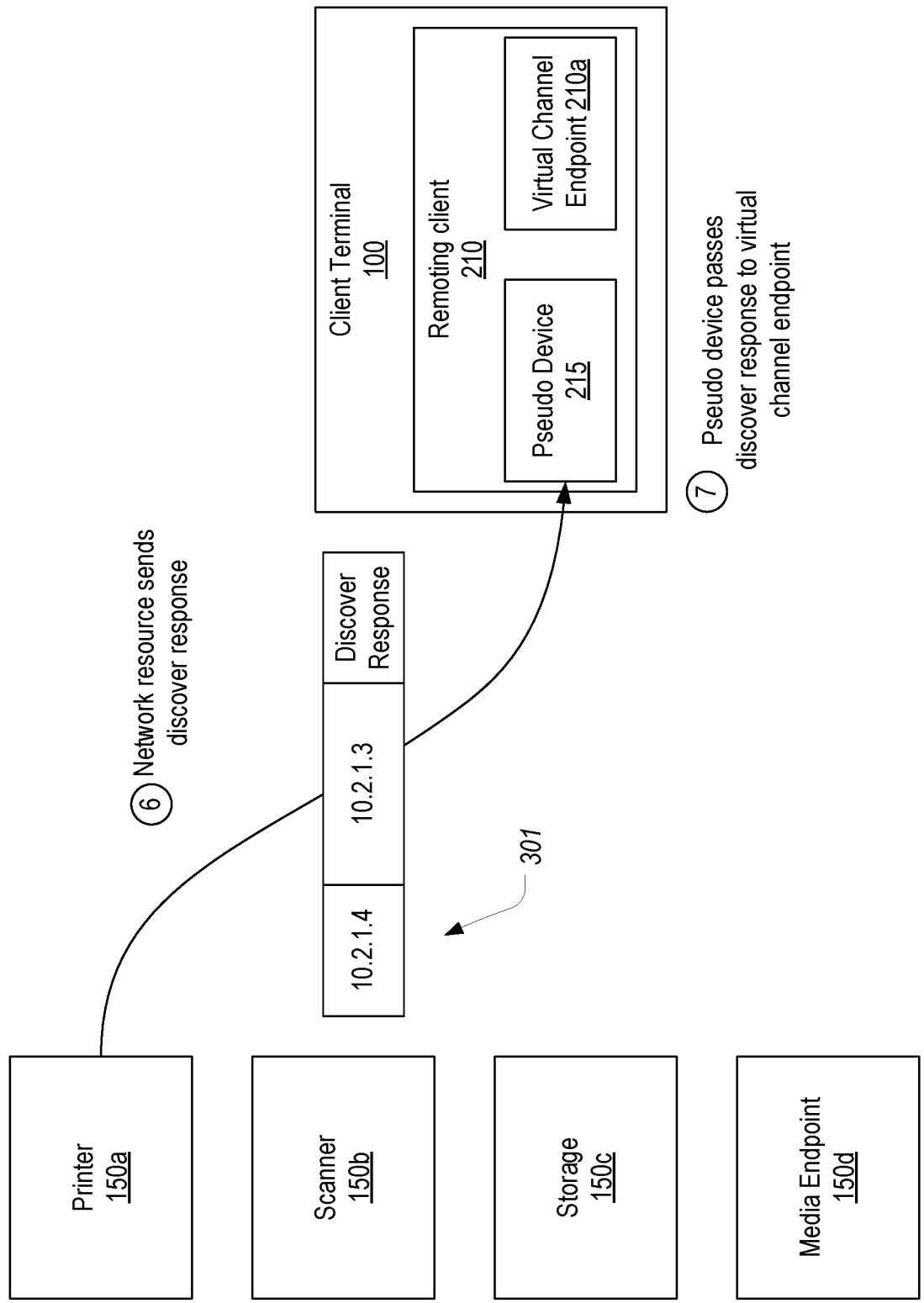

SHARING LOCAL NETWORK RESOURCES WITH A REMOTE VDI INSTANCE

CROSS-REFERENCE TO RELATED APPLICATIONS

N/A

BACKGROUND

Currently, techniques exist for enabling local resources to be accessed from a remote session. These techniques include USB redirection and driver mapping among others. As an example, USB redirection can be employed to allow a printer that is connected directly to a client terminal to be accessed from the remote session. In such cases, the client terminal will need to load a partial USB device stack to properly handle USB communications that are redirected from the remote session to the client terminal.

Although these techniques work, they have various limitations. For example, it will be necessary for the client to include components that know how to handle communications targeting the local resource (e.g., the partial USB device stack in the case of a USB printer). This results in the client terminal, which may oftentimes be a thin client, being more complex (or less thin). Additionally, these techniques are only available for devices that are connected directly to the client terminal—i.e., any network-accessible device or resource will remain inaccessible from the remote session.

BRIEF SUMMARY

The present invention extends to methods, systems, and computer program products for allowing local network resources to be accessed from a remote session. A remoting client that executes on a client terminal and a remoting service that executes in a remote session can each be configured to implement a virtual network pseudo device. These virtual network pseudo devices can be configured to communicate network communications via a virtual channel with the virtual channel endpoints performing any necessary network address translation. As a result, when the remote session host attempts to discover local network resources, the corresponding network communications will be routed over the virtual channel and transmitted over the client's local area network. Any resources on the client's local area network will respond accordingly with this responses being routed back over the virtual channel to the remote session host thus causing the resources to appear as if they were part of the same local area network as the remote session host.

In one embodiment, the present invention is implemented as a method for allowing local network resources to be accessed from a remote session. A pseudo device on a remote session host can receive a network communication and pass it to a virtual channel endpoint on the remote session host. The network communication can then be transferred over a virtual channel of a remote display protocol connection to a virtual channel endpoint on a client terminal. The virtual channel endpoint on the client terminal can then pass the network communication to a pseudo device on the client terminal to cause the network communication to be transmitted over a local area network to which the client terminal is connected. This passing of the network communication can include modifying an IP header of the network communication.

In another embodiment, the present invention is implemented as computer storage media storing computer executable instructions which when executed implement a method for allowing local network resources to be accessed from a remote session. This method includes: establishing, on a remote session host with which a client terminal has established a remote display protocol connection, a server-side pseudo device that functions as a network interface of the remote session host; establishing, on the client terminal, a client-side pseudo device that functions as a network interface of the client terminal to a local area network; establishing a client-side virtual channel endpoint and binding the client-side virtual channel endpoint to the client-side pseudo device; and establishing a server-side virtual channel endpoint and binding the server-side virtual channel endpoint to the server-side pseudo device. The server-side virtual channel endpoint is configured to receive network communications with IP headers from the server-side pseudo device and transfer the network communications with the IP headers to the client-side virtual channel endpoint. The client-side virtual channel endpoint is configured to modify the IP headers of the network communications received from the server-side virtual channel endpoint and pass the network communications with the modified IP headers to the client-side pseudo device for transmittal over the local area network.

In another embodiment, the present invention is implemented as a method for discovering network resources available to a client terminal from a remote session host with which the client terminal has established a remote display protocol connection. A pseudo device on the remote session host receives a first network communication representing a request from a component executing on the remote session host to discover network resources. The first network communication includes an IP header. The first network communication with the IP header is passed to a virtual channel endpoint on the remote session host to cause the first network communication with the IP header to be transferred over a virtual channel to a virtual channel endpoint on the client terminal. Upon receiving the first network communication with the IP header, the virtual channel endpoint on the client terminal modifies the IP header to replace a source IP address with an IP address of a pseudo device on the client terminal. The virtual channel endpoint then passes the first network communication with the modified IP header to the pseudo device on the client terminal to thereby cause the first network communication to be transmitted over a local area network to which the client terminal is connected.

This summary is provided to introduce a selection of concepts in a simplified form that are further described below in the Detailed Description. This Summary is not intended to identify key features or essential features of the claimed subject matter.

BRIEF DESCRIPTION OF THE DRAWINGS

Understanding that these drawings depict only typical embodiments of the invention and are not therefore to be considered limiting of its scope, the invention will be described and explained with additional specificity and detail through the use of the accompanying drawings in which:

FIGS. 3A-3I illustrate how local network resources can be discovered by a remote session host;

DETAILED DESCRIPTION

Figure 1:
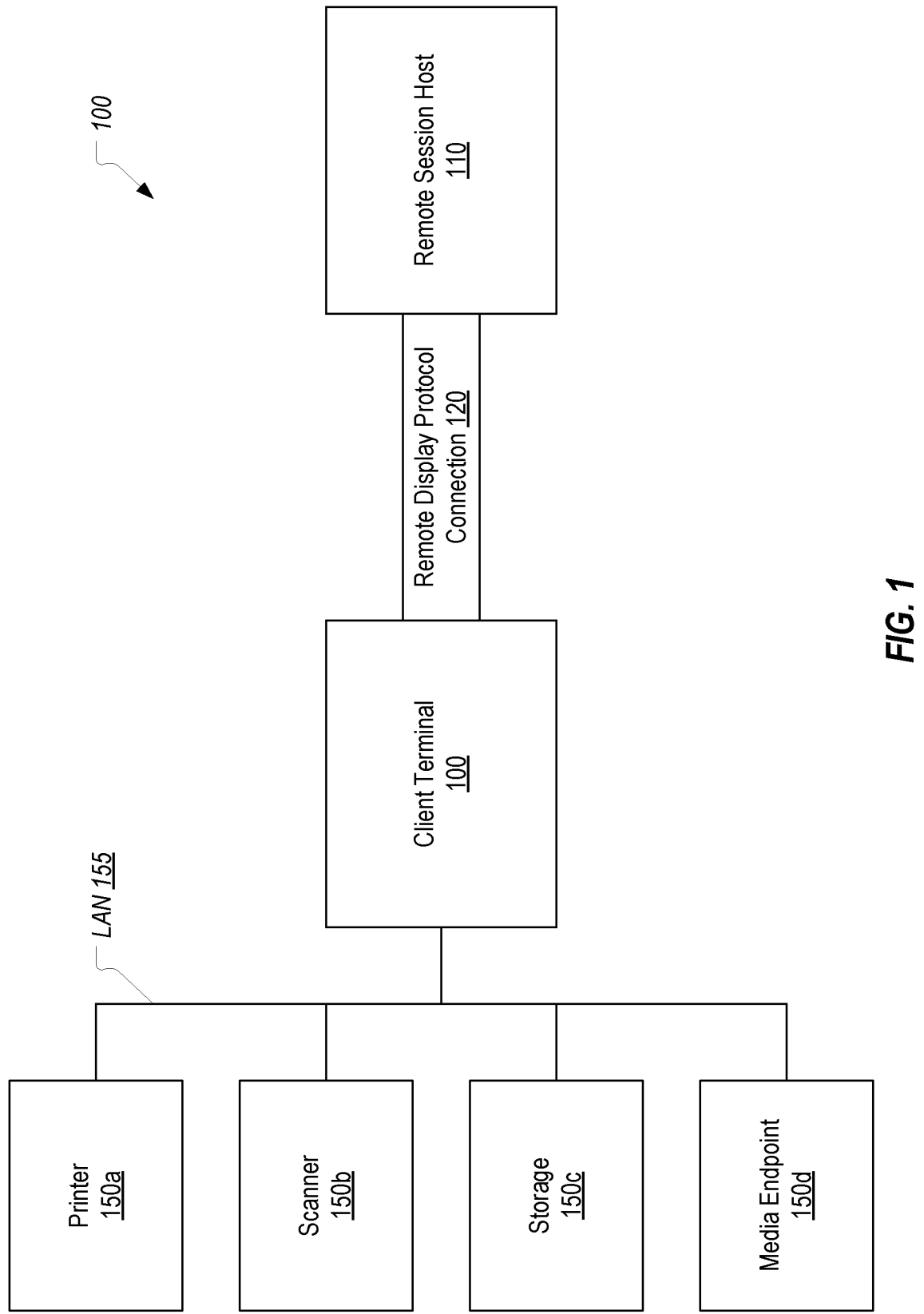
FIG. 1 illustrates an example computing environment in which the present invention can be implemented.

FIG. 1 illustrates an example computing environment 100 in which the present invention can be implemented. Computing environment 100 includes a client terminal 100 and a remote session host 110 that client terminal 100 accesses via a remote display protocol connection 120. Client terminal 100 can be any type of computing device that can execute a "remoting client" including, for example, a desktop computer, a laptop, a thin client, a smart phone, etc. Remote session host 110 can represent either a virtual or a physical machine (or server) that executes a "remoting service" (e.g., Windows Server Remote Desktop Services, VMware Horizon, or Citrix XenServer) for the purpose of allowing client terminal 100 to establish remote sessions. A remote session can either provide access to a full desktop (e.g., a remote desktop session) or may provide access to a single application (e.g., a published (or remote) application session). Remote display protocol connection 120 can be established using any of the various remote display protocols including RDP, ICA, PCoIP, etc.

In computing environment 100, client terminal 100 is connected to a LAN 155. A number of network devices/resources (hereinafter generally network resources 150) are also connected to LAN 155. For purposes of illustration, these network resources include a printer 150a, a scanner 150b, a storage device 150c, and a media endpoint (or DLNA device) 150d. It is noted, however, that any number or type of network resources could be connected to LAN 155. Because network resources 150 are connected to LAN 155, client terminal 100 will be able to access them. In contrast, because remote session host 110 is not connected to LAN 155, it will not be able to access network resources 150 using typical networking techniques, at least without implementing a virtual private network or similar technique. In accordance with embodiments of the present invention, network resources 150 can be made accessible to remote session host 110 as if they were connected to the same LAN as remote session host 110.

Figure 2:
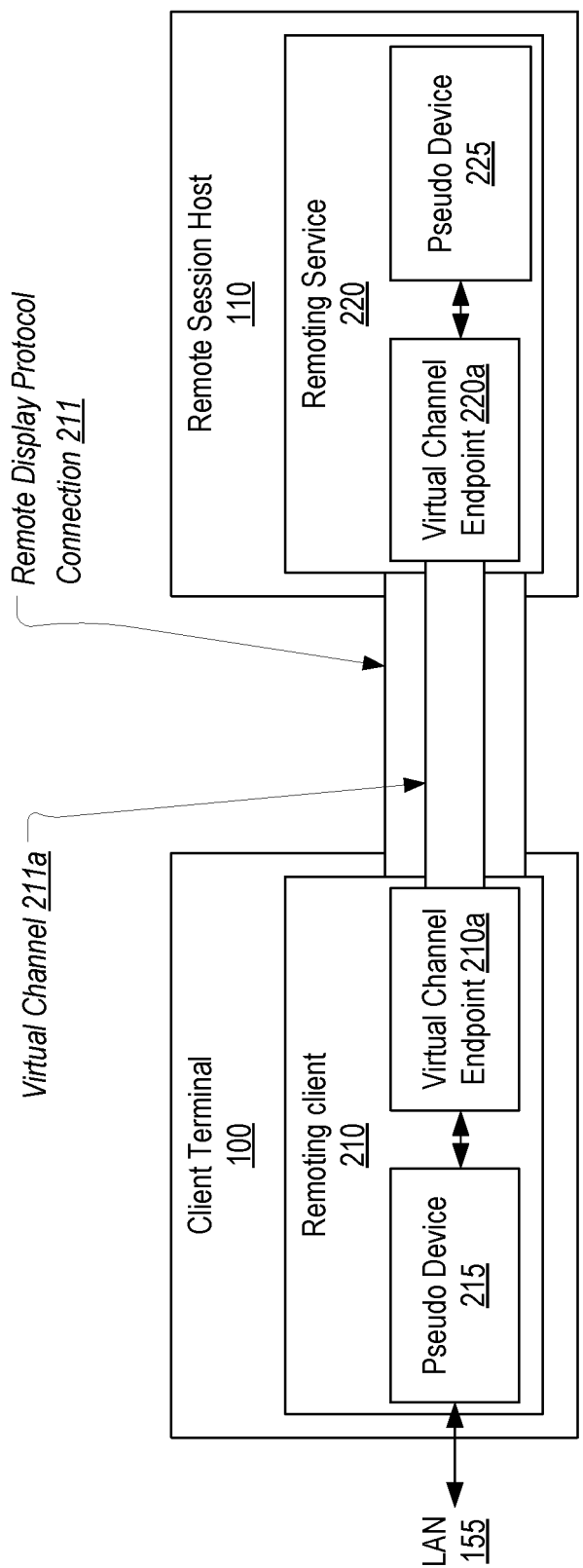
FIG. 2 illustrates an example of a remoting client and an example of a remoting service that can be employed to implement embodiments of the present invention.

FIG. 2 illustrates how a remoting client 210 and a remoting service 220 can be configured to implement embodiments of the present invention. As shown, remoting client 210 executes on client terminal 100 while remoting service 220 executes on remote session host 110. Remoting client 210 and remoting server 220 can implement a remote display protocol to establish remote display protocol connection 211. As mentioned above, remote display protocol connection 211 could be used to transfer display data for an entire desktop or for a single application.

Although not shown, it will be assumed in FIG. 2 that network resources 150 are available to client terminal 100 via LAN 155. In accordance with the techniques of the present invention, remoting client 210 can create a virtual network pseudo device 215 on client terminal 100 that will function as a network interface to LAN 155. As an example, pseudo device 215 can be configured as a virtual network bridge that is linked to a NIC of client terminal 100 and assigned a unique IP address (e.g., an IP address that is different from the IP address assigned to client terminal 100 for purposes of accessing LAN 155 in a typical manner). As a result, pseudo device 215 will have access to LAN 155, or more particularly, will be able to receive communications from and send communications to network resources 150.

Remoting service 220 can also create a virtual network pseudo device 225 on remote session host 110 that will function as a network interface. As an example, pseudo device 225 may be a virtual NIC that is assigned a different IP address from the IP address assigned to another NIC (which may be physical or virtual) of remote session host 110. In some embodiments, pseudo device 225 could be configured as a network gateway.

Pseudo devices 215, 225 can be bound to virtual channel endpoints 210a, 220a respectively. For example, each virtual channel endpoint can be bound to the corresponding pseudo device via a raw socket to allow each virtual channel endpoint to send and receive raw packets. In other words, a raw socket can be used to allow virtual channel endpoints 210a, 220a to receive network communications that include the IP header and to directly define the IP header in network communications they send. Due to virtual channel endpoints 210a, 220a, a virtual channel 211a can be implemented within remote display protocol connection 211.

As an overview of embodiments of the present invention, pseudo device 225 will appear as a network interface to remote session host 110. Therefore, when remote session host 110 attempts to discover resources on a local area network, these discover requests will be received at pseudo device 225 and forwarded over virtual channel 211a to pseudo device 215. Pseudo device 215 can then forward the discover requests onto LAN 155 where they will be received and responded to by network resources 150. Pseudo device 215 can receive these responses and forward them back over virtual channel 211a to pseudo device 225 which will then transmit them to remote session host 110. From the perspective of remote session host 110, it will appear as if the responses had come from network resources connected to the same LAN as remote session host 110 thereby allowing remote session host 110 to communicate with network resources 150 in a typical manner. Pseudo device 225 can handle these subsequent communications in a similar manner to allow remote session host 110 to access the functionality of network resources 150.

FIGS. 3A-3H provide a more detailed example of how pseudo devices 215, 225 can function. For purposes of this example, it will be assumed that remote session host 110 includes a NIC 111 which functions as a network interface for application 112. Application 112 should be construed as representing any network-enabled application or operating system component (i.e., any component that can generate network communications).

Figure 3A:
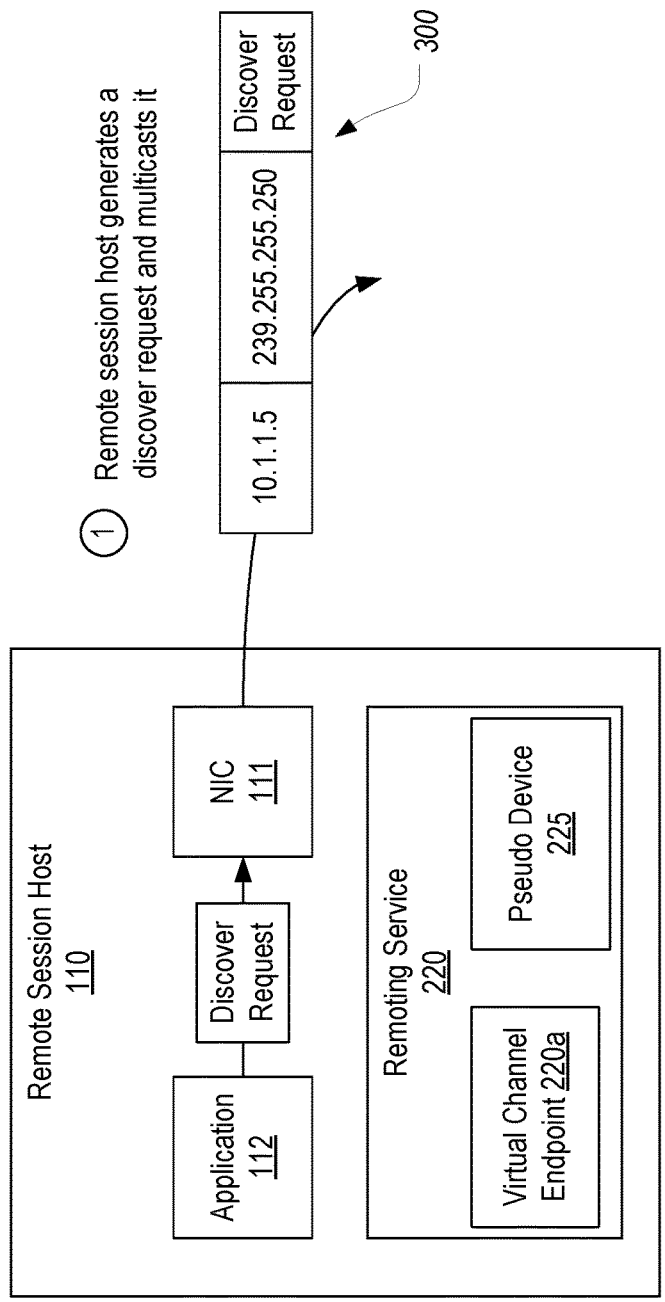
Figure 3B:
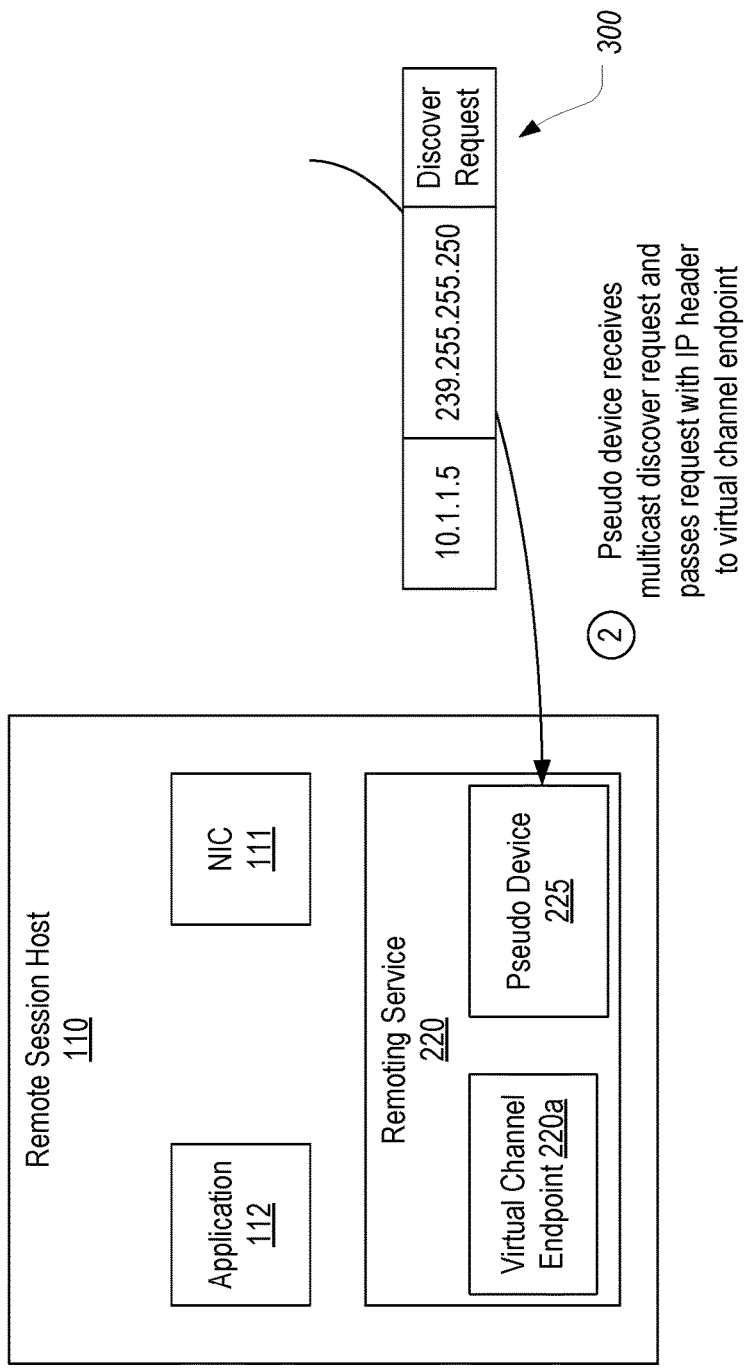

In FIG. 3A, application 112 is shown as generating and sending a discover request. For example, this discover request could conform to the Simple Service Discovery Protocol (SSDP) which is a network protocol that is commonly used to discover resources available on a LAN. As represented in step 1, the discover request can be passed down the protocol stack towards NIC 111 resulting in a network communication 300 containing the discover request being transmitted. For simplicity, these network communications will be represented as IP packets having a source IP address, a destination IP address, and a payload. It is noted, however, that depending on the network configuration, the network communications could be in the form of MAC frames or IP packets. In any case, in FIG. 3A, a network communication 300 having a source IP address of 10.1.1.5

(which is assumed to be the IP address assigned to NIC 111), a destination IP address of 239.255.255.250 (which is a multicast address used for discover requests in SSDP), and a payload containing the actual discover request is transmitted by remote session host 110.

Pseudo device 225 can be configured to be in promiscuous mode meaning that pseudo device 225 will pass on all traffic on the subnet (which will include all network communications from NIC 111). As mentioned above, pseudo device 225 can be bound to virtual channel endpoint 220a via a raw socket such that network communication 300 with the IP header still intact will be passed on to virtual channel endpoint 220a as represented in step 2 of FIG. 3B. In contrast, if pseudo device 225 were bound to virtual channel endpoint 220a via a "non-raw socket," the OS would handle the processing at the network layer resulting in the IP header being removed prior to network communication 300 being delivered to virtual channel endpoint 220a (i.e., virtual channel endpoint 220a would only receive the discover request in the payload of network communication 300).

Figure 3C:
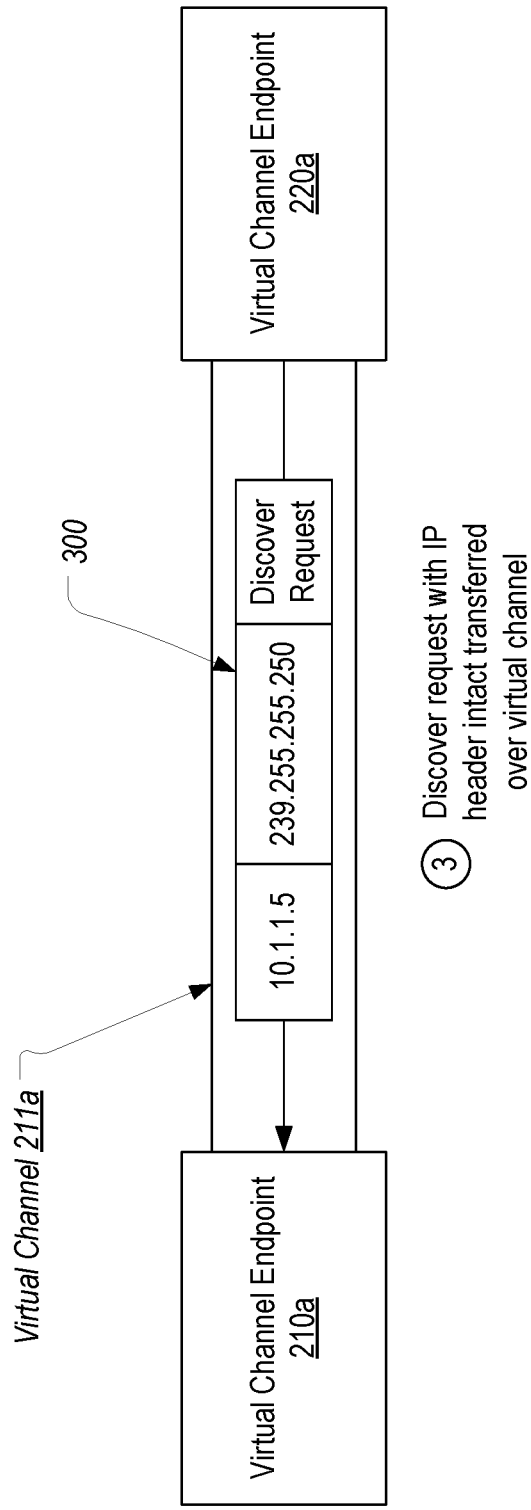
Figure 3D:
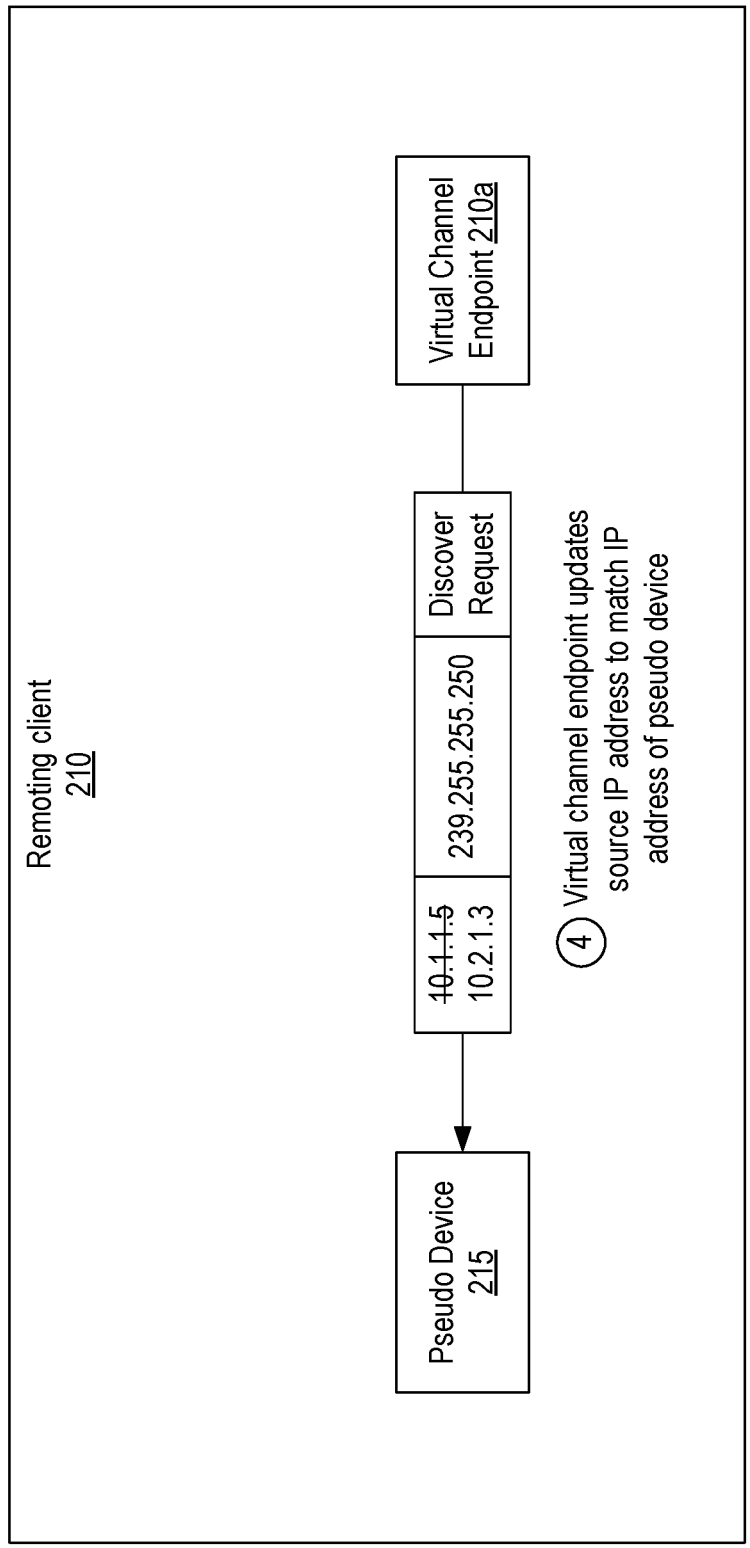

In step 3 as shown in FIG. 3C, virtual channel endpoint 220a will transmit network communication 300 with its IP header over virtual channel 211a. Although not shown and not important to the invention, virtual channel 211a would likely be established via NIC 111. Virtual channel endpoint 210a of remoting client 210 will then receive network communication 300.

As part of establishing pseudo device 215, remoting client 210 can also configure virtual channel endpoint 210a to employ an IP address assigned to pseudo device 215 to modify network communications received over virtual channel 211a. As shown in step 4 of FIG. 3D, this modification can include replacing the source IP address with the IP address that has been assigned to pseudo device 215. In this case, it will be assumed that 10.2.1.3 has been assigned to pseudo device 215 for its IP address on LAN 155. Accordingly, virtual channel endpoint 210a is shown as overwriting 10.1.1.5 (which is an IP address assigned to NIC 111 on remote session host 110's LAN) with 10.2.1.3.

In some embodiments, virtual channel endpoint 210a can perform this overwriting of the source IP address by employing a raw socket. In particular, virtual channel endpoint 210a can be bound to pseudo device 215 via a raw socket which will allow virtual channel endpoint 210a to specify the IP header of communications passed to pseudo device 215. In such cases, upon receiving communication 300, virtual channel endpoint 210a can employ the raw socket to pass network communication 300 with the same payload and destination IP address but with a source IP address matching the IP address assigned to pseudo device 215.

Figure 3E:
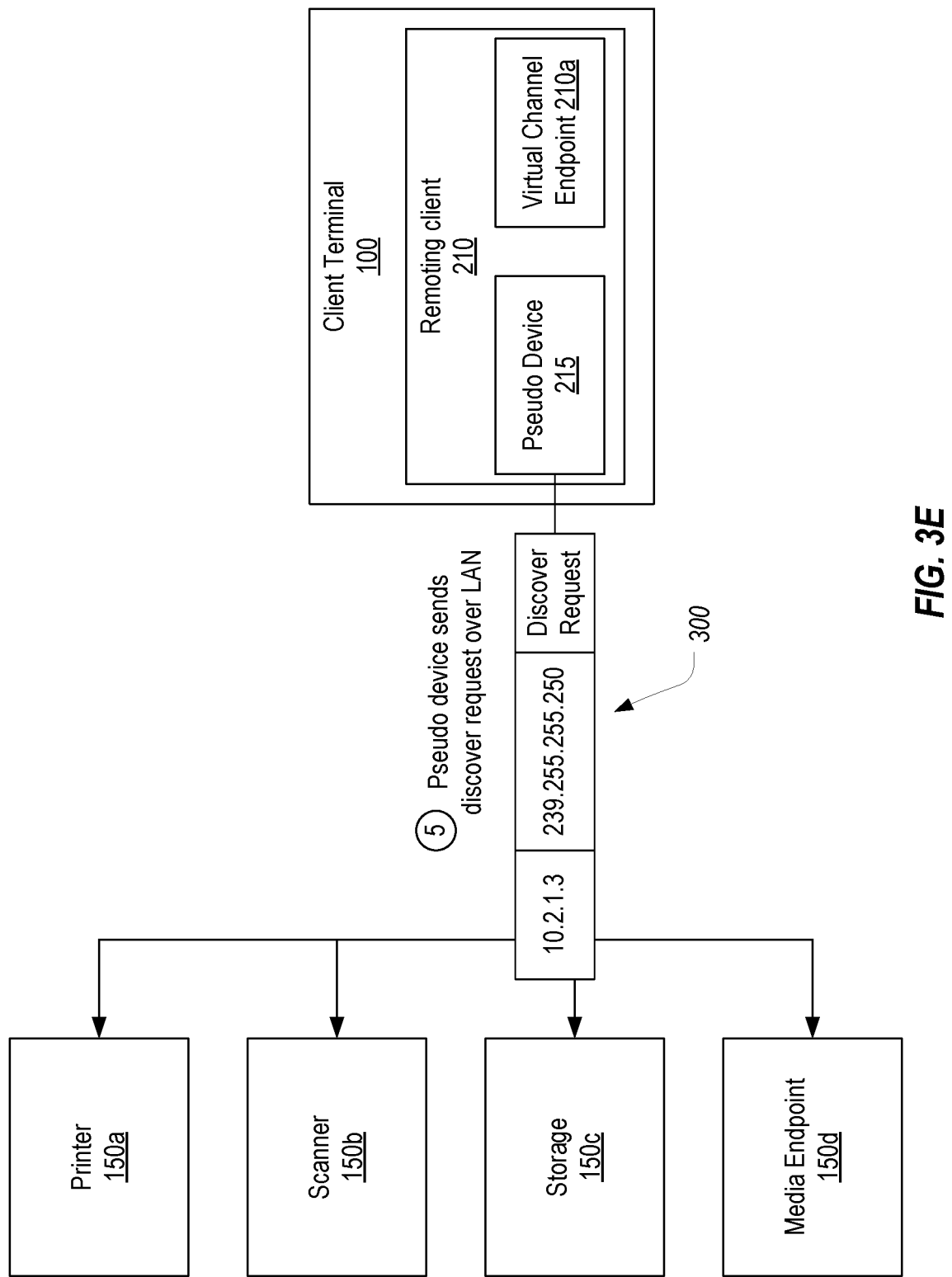
Figure 3G:
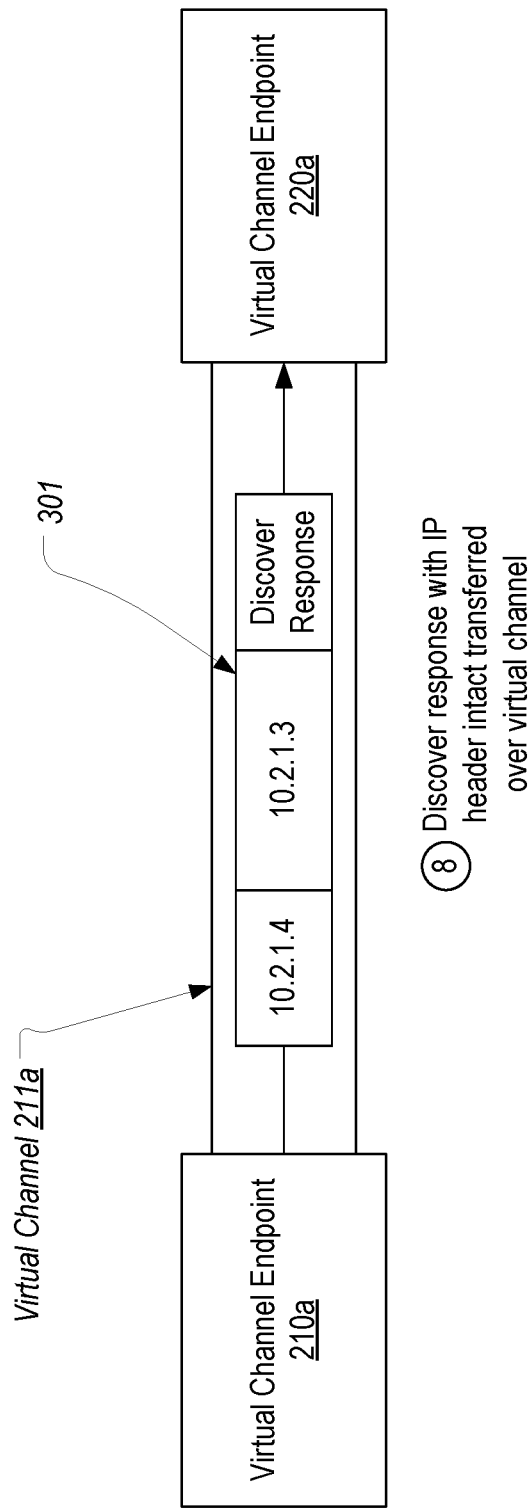
Figure 3H:
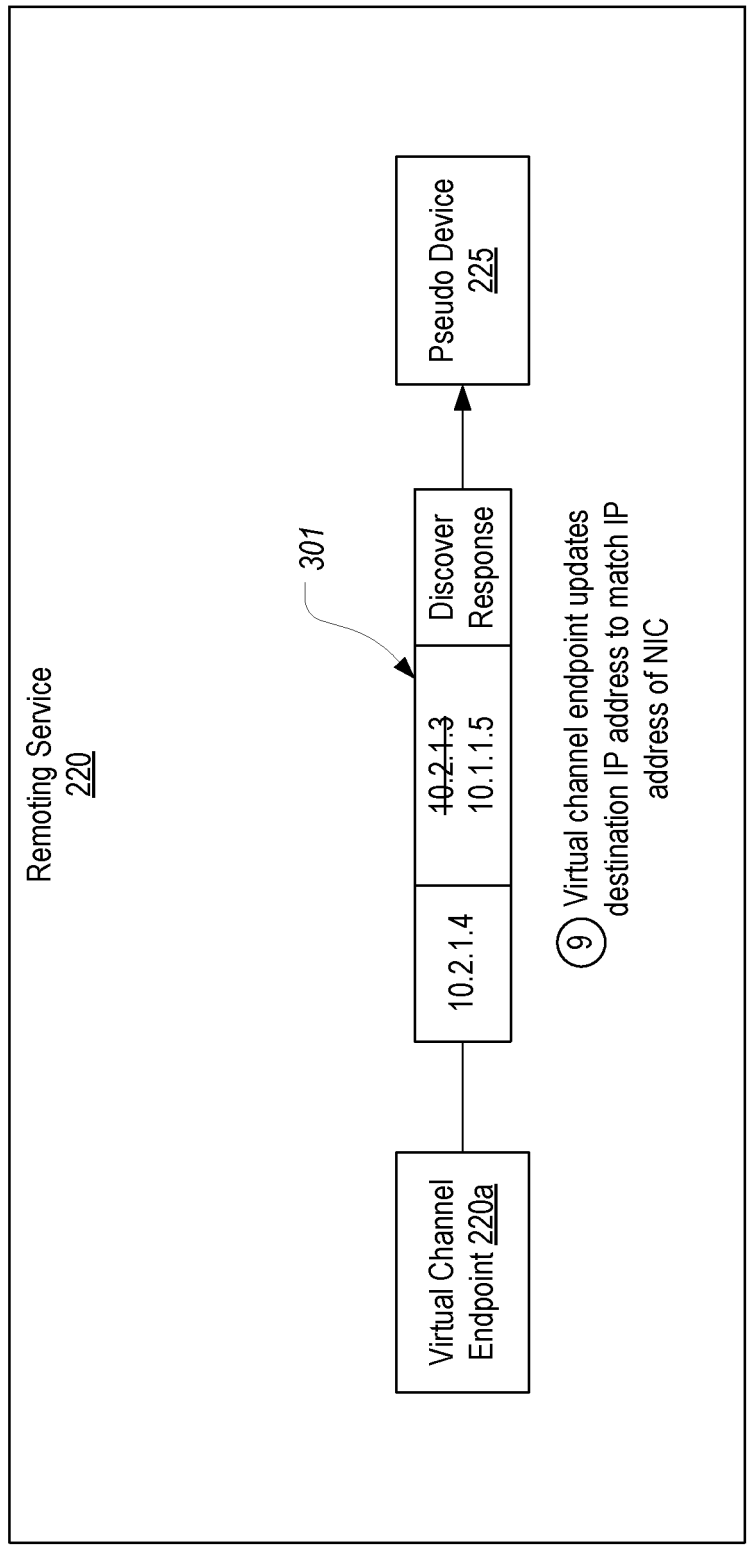

As a result of this updating of the IP header, pseudo device 215 will transmit network communication 300 over LAN 155 as shown in step 5 in FIG. 3E. Because network communication 300 has a destination IP address of 239.255.255.250, each network resource on LAN 155 will receive it (i.e., network communication 300 will be multicast over LAN 155). Network resources 150 will view network communication 300 as having originated at 10.2.1.3 and will therefore send their responses to this IP address.

For example, in step 6 in FIG. 3F, printer 150a is shown as sending a discover response in the form of a network communication 301. Network communication 301 will include a destination IP address of 10.2.1.3, a source IP address of 1.2.1.4 (which is assumed to be the IP address assigned to printer 150a), and a payload that includes the discover response. Because the destination IP address is 10.2.1.3, pseudo device 215 will receive network communication 301. Although not shown, the discover response itself will identify the location of printer 150a on LAN 155 in accordance with the SSDP.

Pseudo device 215 will pass network communication 301 with its IP header intact to virtual channel endpoint 210a (e.g., via a raw socket) as represented in step 7 of FIG. 3F. Virtual channel endpoint 210a will then transfer network communication 301 to virtual channel endpoint 220a over virtual channel 211a as represented in step 8 in FIG. 3G. As shown, the IP header will still be included as network communication 301 is transferred to virtual channel endpoint 220a.

As part of establishing pseudo device 225, remoting service 220 can configure virtual channel endpoint 220a to update the IP header of communications it receives over virtual channel 211a. In particular, virtual channel endpoint 220a can be configured to update the destination IP address to match the IP address assigned to NIC 111. Accordingly, in step 9 of FIG. 3H, virtual channel endpoint 220a is shown as having replaced 10.2.1.3 with 10.1.1.5 which is the IP address of NIC 111. As mentioned above, this can be accomplished by employing a raw socket to pass communication 301 to pseudo device 225 thereby allowing virtual channel endpoint 220a to directly define the IP header.

Figure 3I:
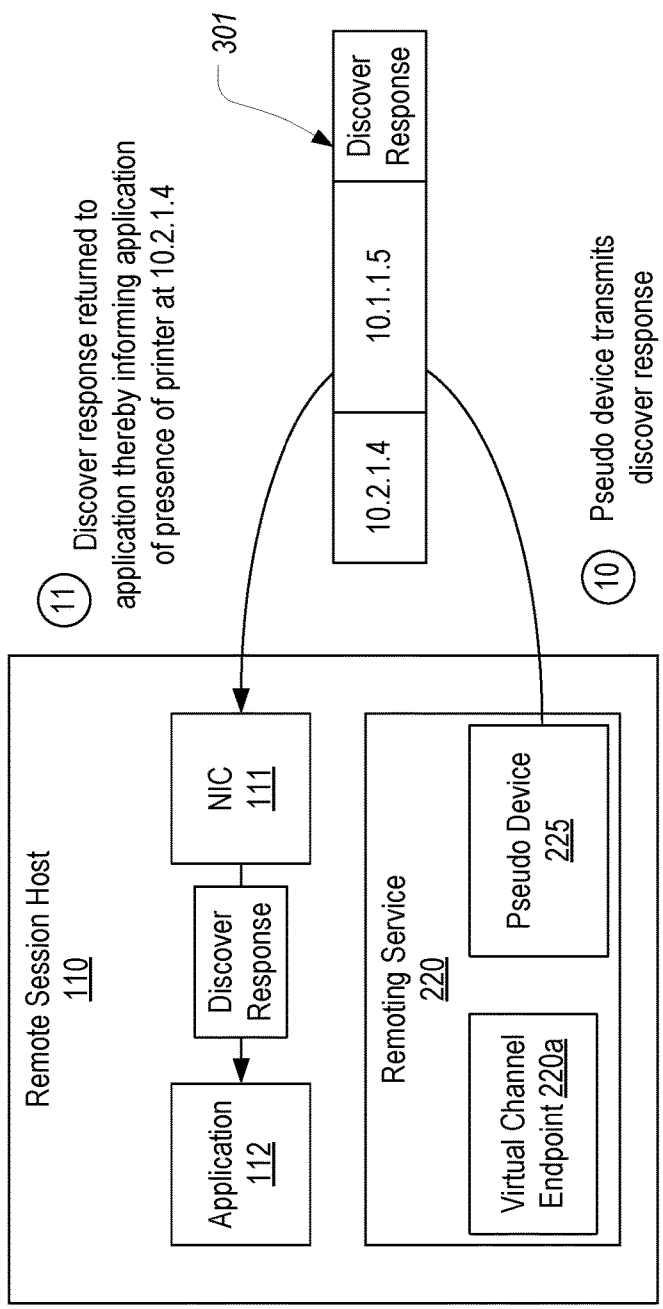

Finally, as shown as step 10 in FIG. 3I, pseudo device 225 will transit communication 301 with the modified destination IP address. Because the destination IP address is 10.1.1.5, NIC 111 will receive communication 301 and pass its payload onto application 112 in step 11. Since the payload includes the discover response (which will identify the location of printer 150a on LAN 155), application 112 will have successful discovered the availability of printer 150a. For example, in SSPD embodiments, the discover response may include "LOCATION: http://10.2.1.4:5200/printer.xml."

Figure 4A:
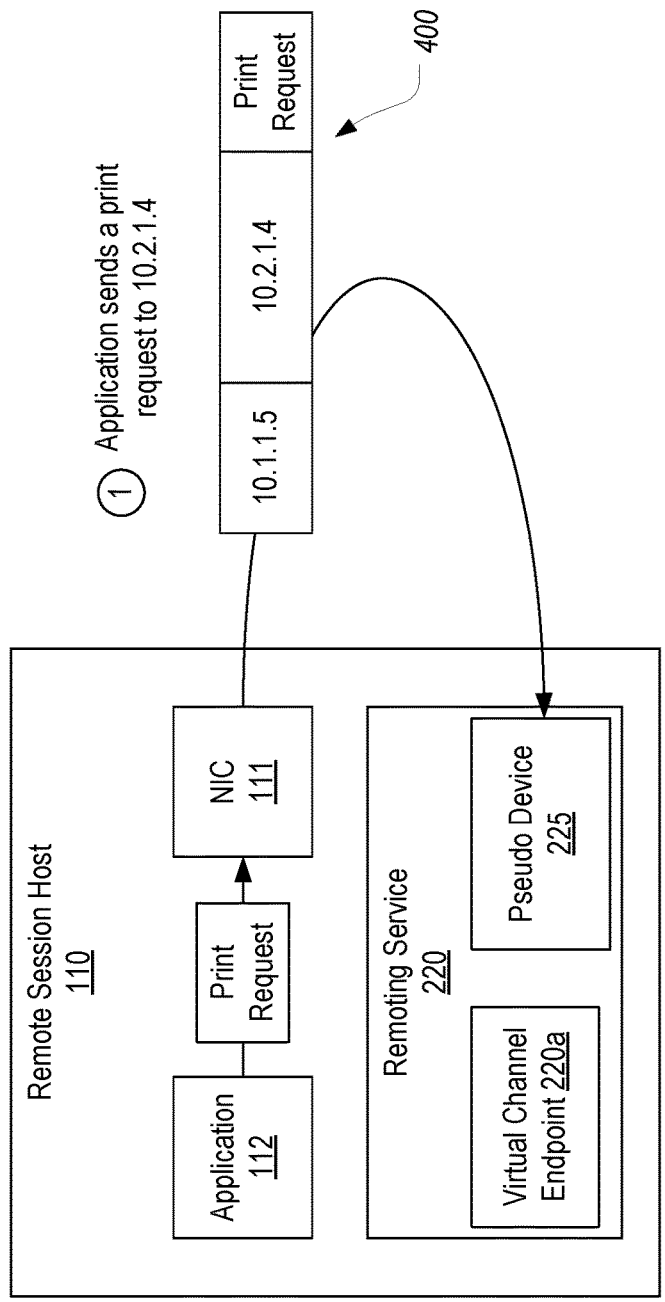
FIGS. 4A and 4B illustrate how a remote session host can access a local network resource.
Figure 4B:
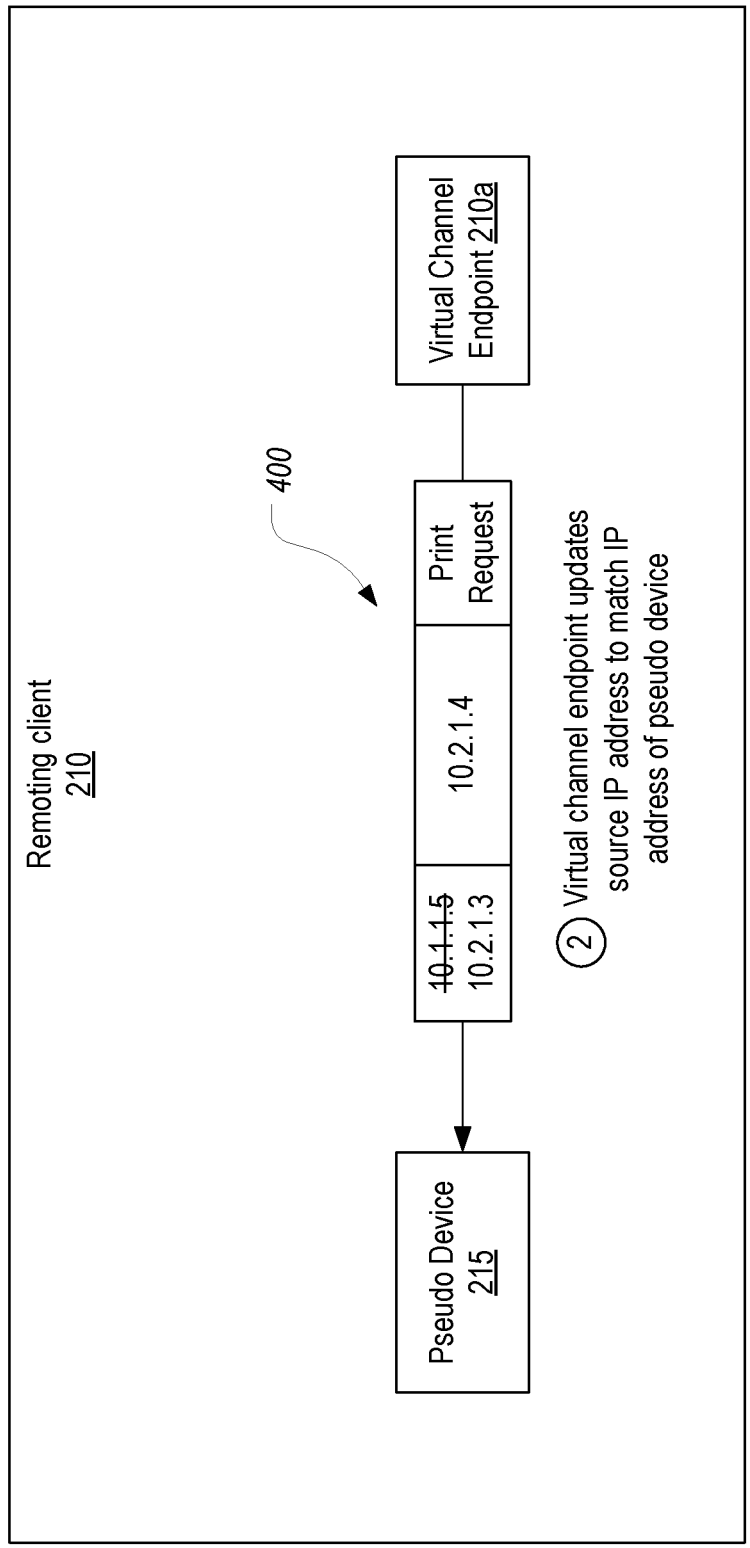

As a result of this process, application 112 will view printer 150a as if it were a local network resource. For example, after discovering printer 150a, application 112 may send a network print request to printer 150a in the same manner that it would send a network print request to a printer that was connected to the same LAN as remote session host 110. To allow this print request to reach printer 150a, a process similar to what is shown in FIGS. 3A-3I can again be performed. FIGS. 4A and 4B summarize this process.

In step 1 in FIG. 4A, application 112 is shown as sending a print request towards NIC 111. Application 112 will specify the location of the printer as 10.2.1.4 in accordance with the previously received discover response. As a result, NIC 111 will transmit a network communication 400 having the print request (which would typically be in XML) in the payload, a source IP address of 10.1.1.5, and a destination IP address of 10.2.1.4 as represented in step 1. It is noted that this destination IP address will not (or at least should not) actually exist on any local area network to which remote session host 110 is connected.

Pseudo device 225 will receive network communication 400 (e.g., because it is in promiscuous mode) and pass it on to virtual channel endpoint 220a with the IP header intact (e.g., via a raw socket). Virtual channel endpoint 220a will route network communication 400 over virtual channel 211a to virtual channel endpoint 210a. Then, virtual channel endpoint 210a can pass network communication 400 onto pseudo device 215 after having updated the source IP address to match the IP address of pseudo device 215 as is represented in step 2 of FIG. 4B. As a result, network communication 400 will be transmitted over LAN 155 and received by printer 150a. Printer 150a can then handle the request is a typical manner. Any response would be routed back to application 112 in the same manner as network communication 301 was routed.

Figure 5A:
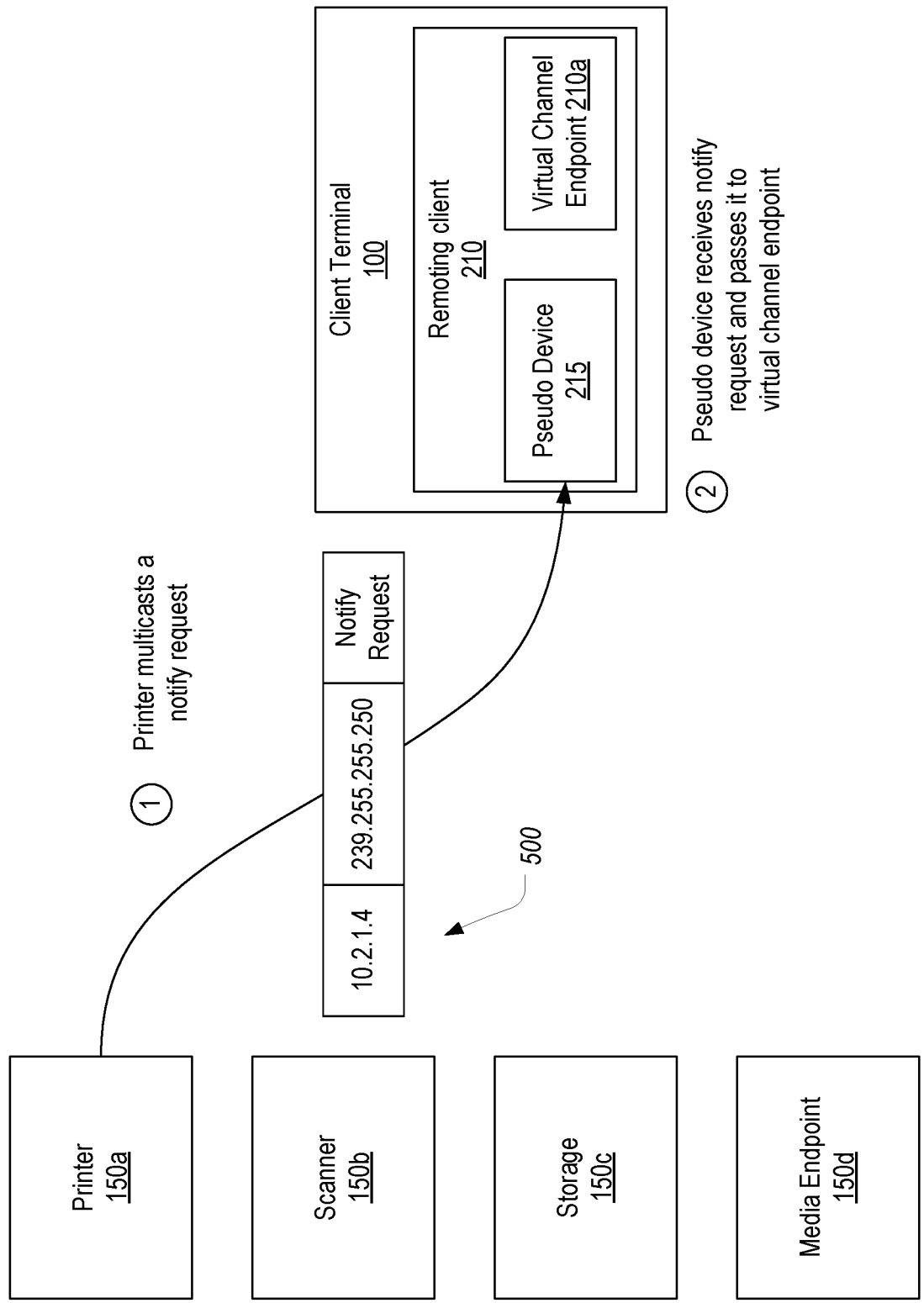
FIGS. 5A and 5B illustrate how the presence of a local network resource can be reported to the remote session host.
Figure 5B:
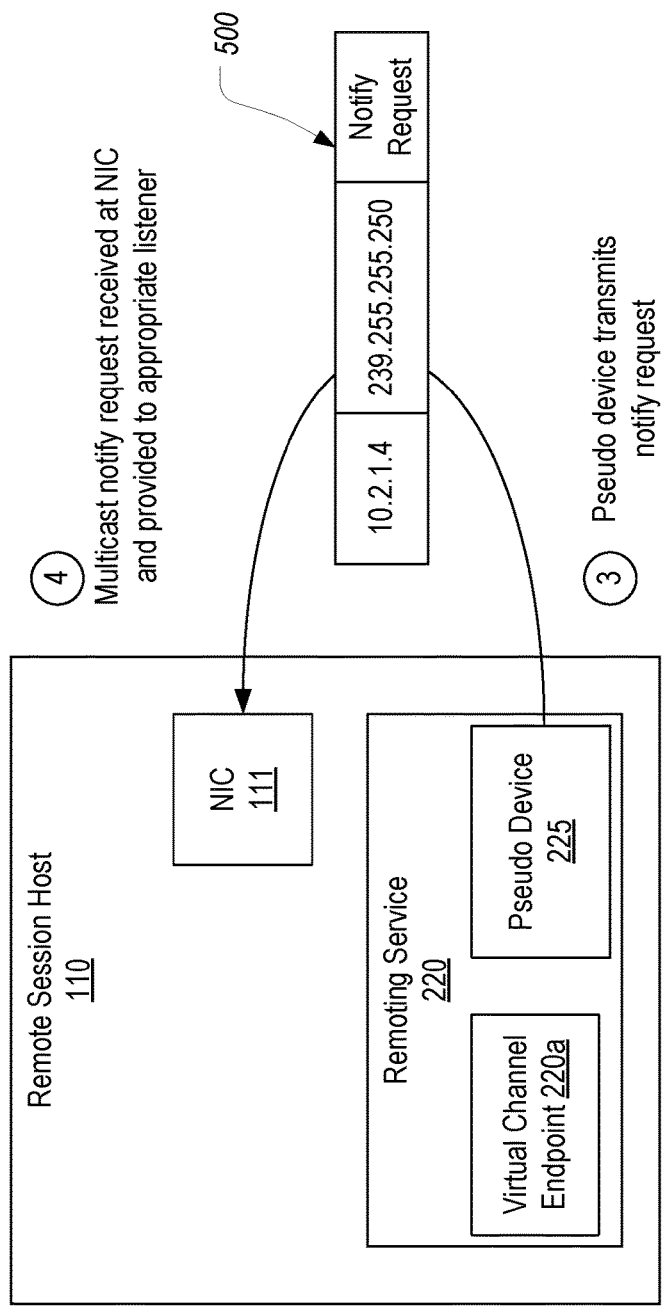

For the sake of completeness, FIGS. 5A and 5B illustrate how notifications multicast by network resources 150 over LAN 155 can be routed to remote session host 110. In this example, it will be assumed that printer 150a has multicast a notify request in the form of network communication 500 and in accordance with the SSDP as shown in step 1 of FIG. 5A. Network communication 500 will includes printer 150a's IP address (10.2.1.4) as the source IP address, a multicast IP address (239.255.255.250) as the destination IP address, and a notify request in the payload.

At step 2, pseudo device 215 will receive the multicast network communication 500 and pass it on to virtual channel endpoint 210a for delivery to virtual channel endpoint 220a. Unlike with previous examples, the receiving virtual channel endpoint (virtual channel endpoint 220a) will not modify the IP header of network communication 500 since its destination is a multicast address. Therefore, in step 3 of FIG. 5B, pseudo device 225 is shown as transmitting network communication 500. Because it is multicast, NIC 111 will receive and process network communication 500 including by passing it to an appropriate listener (e.g., a component of the OS that is configured to detect the availability of network resources). The notify request itself can include an identification of the location of printer 150a (similar to discover response 301) thereby informing remote session host 110 of the availability of printer 150a at 10.2.1.4.

In summary, the present invention allows a user in a remote display protocol (or VDI) environment to access local network resources from a remote session in a seamless manner. For example, if a user connects to a virtual machine with a thin client and wants to print a document to a printer located on the same network as the thin client, the present invention will cause this printer to appear on the virtual machine as if it were on the same network as the virtual machine. As another example, if a user is giving a presentation on a mobile client in a conference room that has a smart video monitor that supports DLNA, the presentation can be cast to the smart video monitor as if the presentation software was running locally on the mobile client rather than in a remote session to which the mobile client is connected.

Figure 6:
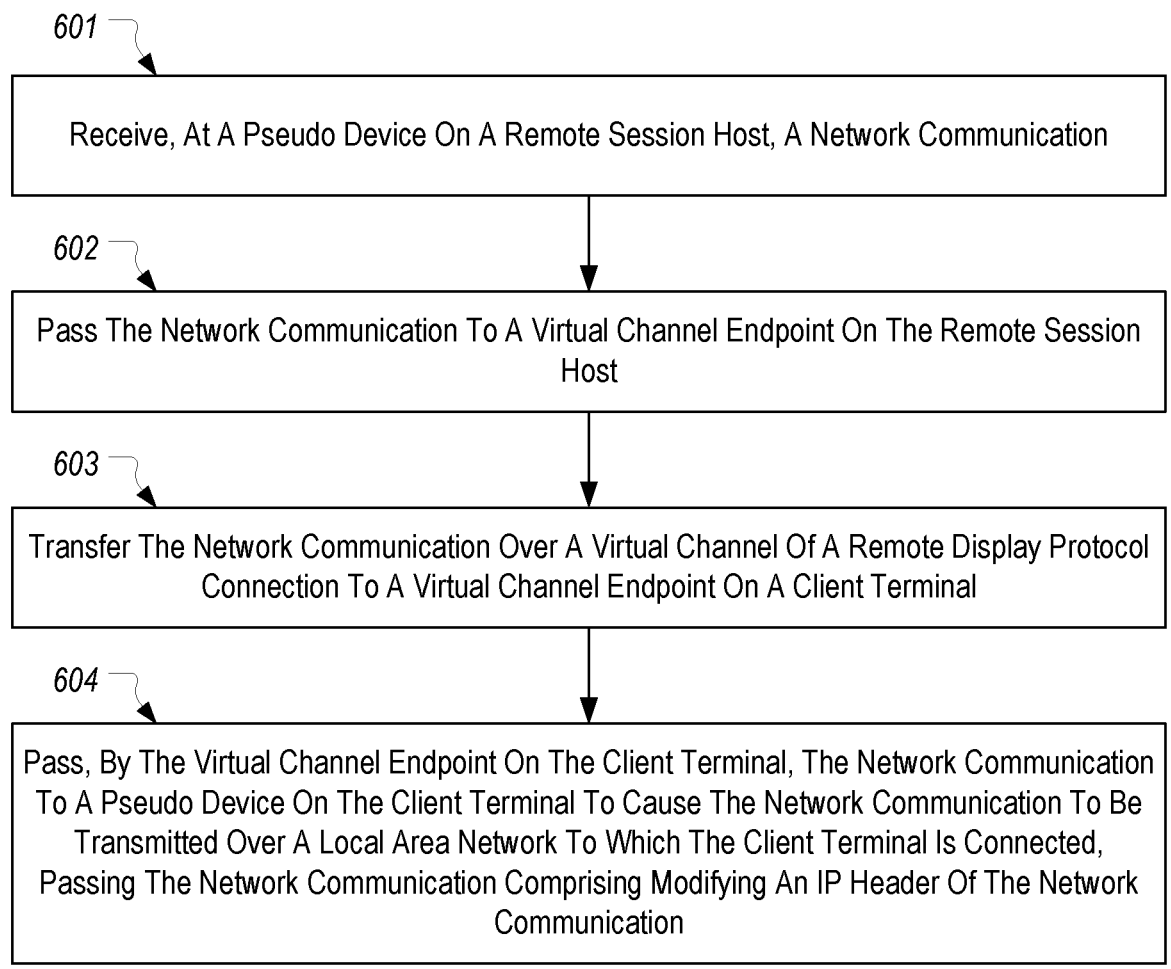
FIG. 6 provides a flowchart of an example method for allowing local network resources to be accessed from a remote session.

FIG. 6 provides a flowchart of an example method 600 for allowing local network resources to be accessed from a remote session. Method 600 can be implemented in a VDI environment by remoting client 210 and remoting service 220.

Method 600 includes an act 601 of receiving, at a pseudo device on a remote session host, a network communication. For example, network communication 300 or 400 could be received at pseudo device 225.

Method 600 includes an act 602 of passing the network communication to a virtual channel endpoint on the remote session host. For example, pseudo device 225 could pass network communication 300 or 400 to virtual channel endpoint 220a (e.g., via a raw socket).

Method 600 includes an act 603 of transferring the network communication over a virtual channel of a remote display protocol connection to a virtual channel endpoint on a client terminal. For example, virtual channel endpoint 220a could transfer network communication 300 or 400 over virtual channel 211a to virtual channel endpoint 210a.

Method 600 includes an act 604 of passing, by the virtual channel endpoint on the client terminal, the network communication to a pseudo device on the client terminal to cause the network communication to be transmitted over a local area network to which the client terminal is connected, passing the network communication comprising modifying an IP header of the network communication. For example, virtual channel endpoint 210a could modify the IP header of network communication 300 or 400 as part of passing the network communication to pseudo device 215 for transmittal over LAN 155.

Embodiments of the present invention may comprise or utilize special purpose or general-purpose computers including computer hardware, such as, for example, one or more processors and system memory. Embodiments within the scope of the present invention also include physical and other computer-readable media for carrying or storing computer-executable instructions and/or data structures. Such computer-readable media can be any available media that can be accessed by a general purpose or special purpose computer system.

Computer-readable media is categorized into two disjoint categories: computer storage media and transmission media. Computer storage media (devices) include RAM, ROM, EEPROM, CD-ROM, solid state drives ("SSDs") (e.g., based on RAM), Flash memory, phase-change memory ("PCM"), other types of memory, other optical disk storage, magnetic disk storage or other magnetic storage devices, or any other similarly storage medium which can be used to store desired program code means in the form of computer-executable instructions or data structures and which can be accessed by a general purpose or special purpose computer. Transmission media include signals and carrier waves.

Computer-executable instructions comprise, for example, instructions and data which, when executed by a processor, cause a general purpose computer, special purpose computer, or special purpose processing device to perform a certain function or group of functions. The computer executable instructions may be, for example, binaries, intermediate format instructions such as assembly language or P-Code, or even source code.

Those skilled in the art will appreciate that the invention may be practiced in network computing environments with many types of computer system configurations, including, personal computers, desktop computers, laptop computers, message processors, hand-held devices, multi-processor systems, microprocessor-based or programmable consumer electronics, network PCs, minicomputers, mainframe computers, mobile telephones, PDAs, tablets, pagers, routers, switches, and the like.

The invention may also be practiced in distributed system environments where local and remote computer systems, which are linked (either by hardwired data links, wireless data links, or by a combination of hardwired and wireless data links) through a network, both perform tasks. In a distributed system environment, program modules may be located in both local and remote memory storage devices. An example of a distributed system environment is a cloud of networked servers or server resources. Accordingly, the present invention can be hosted in a cloud environment.

The present invention may be embodied in other specific forms without departing from its spirit or essential characteristics. The described embodiments are to be considered in all respects only as illustrative and not restrictive. The scope of the invention is, therefore, indicated by the appended claims rather than by the foregoing description.

What is claimed:

1. A method, implemented in a computing environment that includes a client terminal that is connected to a local area network and a remote session host that is not connected to the local area network, for allowing local network resources of the local area network to be accessed from a remote session that the client terminal has established on the remote session host using a remote display protocol connection, the method comprising:
- receiving, at a pseudo device on the remote session host, a network communication with an IP header, the network communication being received while the client terminal has established the remote session on the remote session host, the pseudo device on the remote session host not being connected to the local area network;
- passing the network communication with the IP header to a virtual channel endpoint on the remote session host;
- transferring the network communication with the IP header over a virtual channel of the remote display protocol connection to a virtual channel endpoint on the client terminal; and
- passing, by the virtual channel endpoint on the client terminal, the network communication to a pseudo device on the client terminal to cause the network communication to be transmitted over the local area network to which the client terminal is connected, passing the network communication comprising modifying the IP header of the network communication by modifying a source IP address in the IP header to match an IP address assigned to the pseudo device on the client terminal.

2. The method of claim 1, wherein the pseudo device on the remote session host passes the network communication to the virtual channel endpoint on the remote session host via a raw socket.

3. The method of claim 1, wherein the network communication received at the pseudo device on the remote session host is one of an IP packet or a MAC frame.

4. The method of claim 1, further comprising:
- receiving, at the pseudo device on the client terminal, a second network communication;
- passing the second network communication to the virtual channel endpoint on the client terminal;
- transferring the second network communication over the virtual channel to the virtual channel endpoint on the remote session host;
- determining, by the virtual channel endpoint on the remote session host, that the second network communication includes an IP header having a destination IP address that is a multicast IP address; and
- based on the determination, passing the second network communication to the pseudo device on the remote session host without modifying the destination IP address in the IP header.

5. The method of claim 1, wherein the virtual channel endpoint on the client terminal passes the network communication with the IP header to the pseudo device via a raw socket, and wherein modifying the IP header of the network communication comprises maintaining a destination IP address that was specified in the IP header as received over the virtual channel.

6. The method of claim 5, wherein the destination IP address is one of:
- a multicast IP address; or
- an IP address of a network resource on the local area network to which the client terminal is connected.

7. The method of claim 1, further comprising:
- receiving, at the pseudo device on the client terminal, a second network communication;
- passing the second network communication to the virtual channel endpoint on the client terminal;
- transferring the second network communication over the virtual channel to the virtual channel endpoint on the remote session host; and
- passing the second network communication to the pseudo device on the remote session host, passing the second network communication comprising modifying an IP header of the second communication to include a destination IP address associated with a NIC of the remote session host.

8. The method of claim 7, wherein the destination IP address specified in the IP header when the second communication is received at the virtual channel endpoint on the remote session host matches an IP address associated with the pseudo device on the client terminal.

9. The method of claim 1, wherein the pseudo device on the remote session host is configured as a network gateway.

10. One or more non-transitory computer storage media storing computer executable instructions which, when executed in a computing environment that includes a client terminal that is connected to a local area network and a remote session host that is not connected to the local area network, implement a method for allowing local network resources of the local area network to be accessed from a remote session that the client terminal has established on the remote session host using a remote display protocol connection, the method comprising:
- establishing, on the remote session host with which the client terminal has established the remote session using the remote display protocol connection, a server-side pseudo device that functions as a network interface of the remote session host, the server-side pseudo device not being connected to the local area network;
- establishing, on the client terminal, a client-side pseudo device that functions as a network interface of the client terminal to the local area network;
- establishing a client-side virtual channel endpoint and binding the client-side virtual channel endpoint to the client-side pseudo device; and
- establishing a server-side virtual channel endpoint and binding the server-side virtual channel endpoint to the server-side pseudo device;
- wherein the server-side virtual channel endpoint is configured to receive network communications with IP headers from the server-side pseudo device and to transfer the network communications with the IP headers to the client-side virtual channel endpoint; and
- wherein the client-side virtual channel endpoint is configured to modify the IP headers of the network communications received from the server-side virtual channel endpoint to cause a source IP address in the IP header of each network communication to match an IP address assigned to the pseudo device on the client terminal and to pass the network communications with the modified IP headers to the client-side pseudo device for transmission over the local area network.

11. The non-transitory computer storage media of claim 10, wherein the client-side virtual channel endpoint is configured to receive network communications with IP headers from the client-side pseudo device and to transfer the network communications with IP headers to the server-side virtual channel endpoint.

12. The non-transitory computer storage media of claim 11, wherein the server-side virtual channel endpoint is configured to selectively modify the IP headers of the network communications received from the client-side virtual channel endpoint based on a destination IP address.

13. The non-transitory computer storage media of claim 12, wherein, when the destination IP address in the IP header of a network communication received from the client-side virtual channel endpoint matches an IP address associated with the client-side pseudo device, the server-side virtual channel endpoint modifies the IP header by specifying a destination IP address associated with a NIC of the remote session host.

14. The non-transitory computer storage media of claim 12, wherein, when the destination IP address in the IP header of a network communication received from the client-side virtual channel endpoint is a multicast IP address, the server-side virtual channel endpoint does not modify the IP header.

15. The non-transitory computer storage media of claim 10, wherein the client-side virtual channel endpoint is bound to the client-side pseudo device via a raw socket, and the server-side virtual channel endpoint is bound to the server-side pseudo device via a raw socket.

16. The non-transitory computer storage media of claim 10, wherein the server-side pseudo device is configured as a network gateway and the client-side pseudo device is a virtual bridge.

17. The non-transitory computer storage media of claim 10, wherein the network communications received from the server-side pseudo device target the local network resources of the local area network, and the network communications received from the client-side pseudo device originate from the local network resources.

18. A method, implemented in a computing environment that includes a client terminal that is connected to a local area network and a remote session host that is not connected to the local area network, for discovering network resources of the local area network from the remote session host while the client terminal has established a remote session on the remote session host using a remote display protocol connection, the method comprising:
receiving, at a pseudo device on the remote session host, a first network communication representing a request from a component executing on the remote session host to discover network resources, the first network communication including an IP header, the first network communication being received while the client terminal has established the remote session on the remote session host, the pseudo device on the remote session host not being connected to the local area network;
passing the first network communication with the IP header to a virtual channel endpoint on the remote session host to cause the first network communication with the IP header to be transferred over a virtual channel to a virtual channel endpoint on the client terminal;
upon receiving the first network communication with the IP header at the virtual channel endpoint on the client terminal, modifying the IP header to replace a source IP address with an IP address of a pseudo device on the client terminal; and
passing the first network communication with the modified IP header to the pseudo device on the client terminal to thereby cause the first network communication to be transmitted over the local area network to which the client terminal is connected.

19. The method of claim 18, further comprising:
receiving, at the pseudo device on the client terminal, a second network communication representing a discover response from a first network resource on the local area network, the second network communication including an IP header;
passing the second network communication with the IP header to the virtual channel endpoint on the client terminal to cause the second network communication with the IP header to be transferred over the virtual channel to the virtual channel endpoint on the remote session host;
upon receiving the second network communication with the IP header at the virtual channel endpoint on the remote session host, modifying the IP header to replace a destination IP address with an IP address associated with a NIC of the remote session host; and
transmitting the second network communication with the modified IP header to the NIC.

20. The method of claim 19, further comprising:
receiving, at the pseudo device on the remote session host, a third network communication representing a request to access the first network resource, the third network communication including an IP header with a destination IP address matching an IP address associated with the first network resource on the local area network;
passing the third network communication with the IP header to the virtual channel endpoint on the remote session host to cause the third network communication with the IP header to be transferred over the virtual channel to the virtual channel endpoint on the client terminal;
upon receiving the third network communication with the IP header at the virtual channel endpoint on the client terminal, modifying the IP header to replace a source IP address with the IP address of the pseudo device on the client terminal; and
passing the third network communication with the modified IP header to the pseudo device on the client terminal to thereby cause the first network communication to be transmitted over the local area network.

* * * * *